United States Patent [19]

Spillman, Jr.

[11] Patent Number: 4,556,791
[45] Date of Patent: Dec. 3, 1985

[54] PHOTOELASTIC SENSOR USING A VARIABLE INTENSITY LIGHT SOURCE AS A FEEDBACK MEANS

[75] Inventor: William B. Spillman, Jr., Acton, Mass.

[73] Assignee: Sperry Corporation, New York, N.Y.

[21] Appl. No.: 502,052

[22] Filed: Jun. 7, 1983

[51] Int. Cl.⁴ .............................................. G02F 1/01
[52] U.S. Cl. .................................. 250/225; 250/205; 73/657
[58] Field of Search ................... 250/225, 231 P, 204, 250/205; 350/371; 356/351, 364, 365, 33; 73/800, 655, 656, 657

[56] References Cited

U.S. PATENT DOCUMENTS

| | | | |
|---|---|---|---|
| 3,902,805 | 9/1975 | Redner | 250/255 |
| 4,171,908 | 10/1979 | Robert | 73/800 |
| 4,180,328 | 12/1979 | Drain | 73/657 |
| 4,368,645 | 1/1983 | Glenn | 356/33 |

Primary Examiner—David C. Nelms
Assistant Examiner—J. Gatto
Attorney, Agent, or Firm—Howard P. Terry

[57] ABSTRACT

Light from an external source is collimated, polarized, passed through a voltage dependent quarterwave plate and onto an elasto-optic sensor which serves to retard the light passing therethrough as a function of the external stress being measured. Light emanating from the sensor is divided into components at ±45° to the applied stress axis. These components are coupled through optical fibers to photodetectors and the resulting electrical signals are applied to difference amplifier. The amplifier output is used to control a second light source whose output via an optical fiber is converted to a voltage suitable to drive the voltage dependent quarterwave plate in a negative feedback fashion such that the wave retardations resulting from the applied stress and nulled out. The power necessary to drive the voltage dependent quarterwave plate is used as a measure of the applied stress.

2 Claims, 1 Drawing Figure

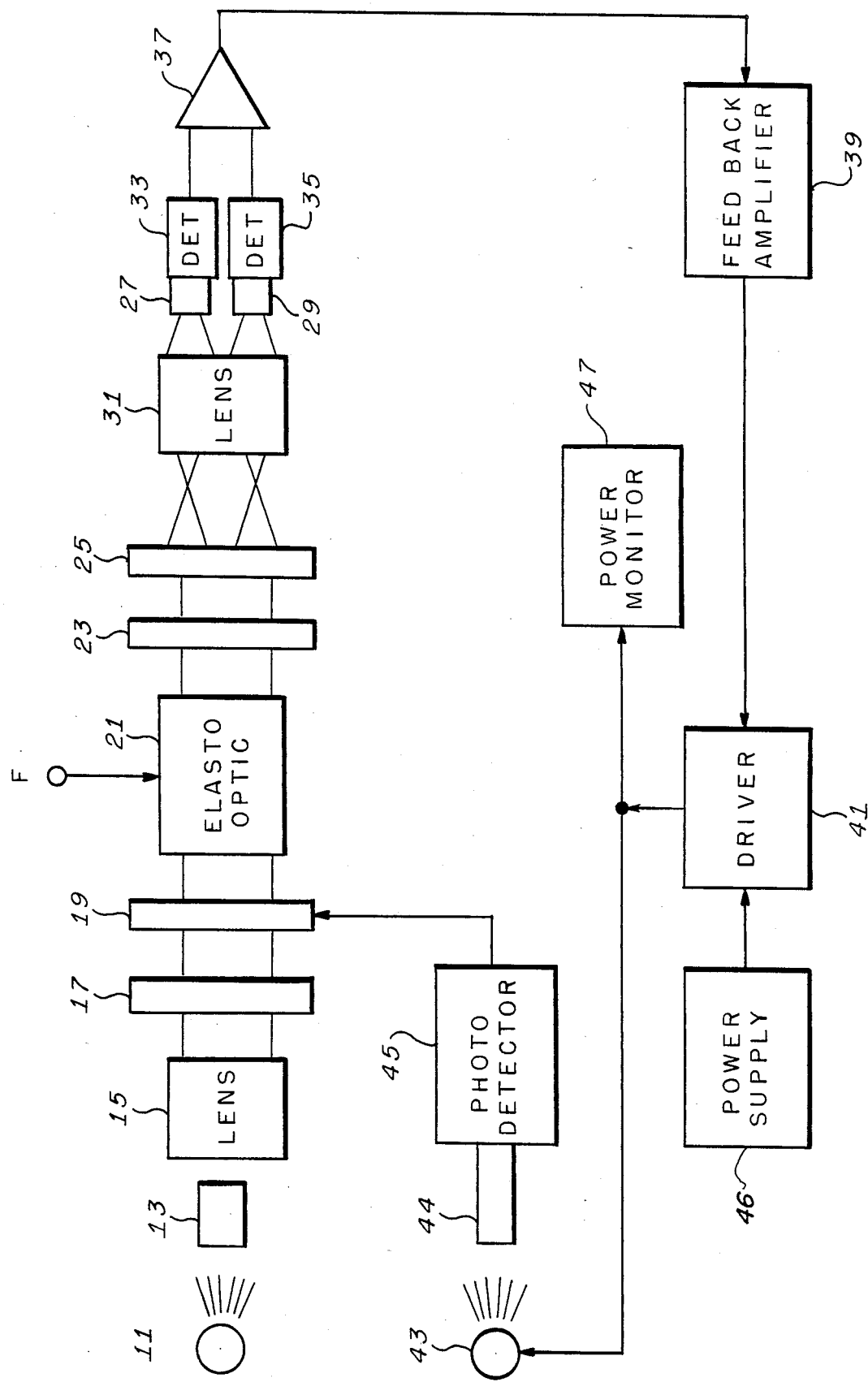

PHOTOELASTIC SENSOR USING A VARIABLE INTENSITY LIGHT SOURCE AS A FEEDBACK MEANS

BACKGROUND OF THE INVENTION

1. Field of the Invention

The present invention relates to transducers that convert pressure variations into electrical output signals and more specifically to transducers utilizing electro-optic sensors in a fiber optic system.

2. Description of the Prior Art

Fiber optic transducers responsive to ambient conditions ordinarily utilize a membrane that is deflected by variations in ambient conditions such as atmospheric pressure. The membrane is coupled to one or more optical fibers having opposing end faces disposed on either side of an air gap. Motion of the membrane distorts the fibers and causes a variation of the coupling of the light across the air gap which can be detected and measured electronically.

Co-pending patent application Ser. No. 248,616, now abandoned, filed in the name of D. H. McMahon and assigned to the present assignee concerns a transducer that utilizes the birefringent properties of elast-optic materials to measure ambient conditions such as temperature, pressure or acceleration. Light is coupled from a source to a collimating lens through an optical fiber. The light from the lens is applied to a polarizer oriented at 45° to the vertical and thence to an elasto-optic material such as glass. Lucite or Plexiglass which becomes birefringent under applied mechanical stress. The birefringence creates a difference in phase between the vertical and horizontal components of the polarized light which is a function of the stress applied to the elasto-optic material. The phase shifted components are further processed and applied to optical detectors which provide an electrical signal indicative of the phase difference between the vertical and horizontal components and therefore the stress applied to the elasto-optic material.

The device of the present invention employs an elasto-optic sensor similar to the McMahon device but provides greatly improved sensitivity and linearity by utilizing a novel null balance technique.

SUMMARY OF THE INVENTION

A force responsive sensor utilizes the birefringent properties of an elasto-optic member to retard the phase of light beams passing through the member as a function of the applied force. The light beam is split into orthogonal wave components which are converted into electrical signals and compared in a difference amplifier whose output is used in a feedback loop to drive a voltage responsive wave retardation means in a negative feedback fashion such that the wave retardations resulting from the applied stress are nulled out. The power necessary to drive the voltage dependent quarterwave plate is used as a measure of the applied stress.

BRIEF DESCRIPTION OF THE DRAWING

The sole FIGURE is a schematic diagram illustrating a photoelastic sensor embodying the principles of the invention.

DESCRIPTION OF THE PREFERRED EMBODIMENT

The principles and operation of the invention can be understood by referring to the accompanying drawing wherein light from a source 11 is passed through an optical fiber element 13 and a lens 15. The lens 15 may typically be a known type of graded index rod ("Grin-rod") which serves to collimate light emanating from the optical fiber element and to direct the collimated beam onto a polarizer 17 oriented at 45° with respect to the vertical so as to produce a polarized beam having that orientation. The polarized light from the polarizer 17 in turn, is directed onto a voltage dependent quarter-wave plate 19 which serves as an active retardation plate that produces optical retardation of light waves passing therethrough as a function of an applied voltage V. Such active retardation plates are known in the art and may, for instance, consist of a liquid crystal cell or a $PVF_2$ element across which a control voltage may be applied. The variably retarded light waves are directed onto an elasto-optic member 21 which is used to sense the external force F to be measured. Various materials such as glass, Lucite and Plexiglass are known to become birefringent under uniaxial stress such as the vertical force F indicated in the drawing.

The vertical axis of the elasto-optic material is algined with the force to be measured. With no external force applied to the elasto-optic member 21, the refractive indices for the horizontal and vertical components of the incident polarized light beam are equal and these components traverse equal path lengths through that member. When a vertical force F is applied to the member 21 however, the refractive indices for the two components are different. Each component therefore travels along a different path length and experiences a different phase shift in passing through the member 21. The magnitude of the phase shifts as a function of the magnitude of the applied force F.

The light emanating from the elasto-optic member is directed onto a beam splitting means which serves to provide output beams oriented at ±45° to the vertical stress axis. Typically, the beam splitting means may be in the form of a Wallaston prism or, as indicated in the accompanying drawing, the beam splitter may include a conventional combination of a half wave plate 23 oriented at 22 ½° to the stress axis and a conventional polarizing beam splitter 25 oriented parallel to the stress axis. The two beams are then directed onto optical fiber elements 27 and 29 by lens means 31. Typically, the lens means 31 comprises a pair of graded index rods (Grin-rods) for coupling the light beams to the optical fiber elements. The optical fiber elements transmit the individual beams to photodetectors 33 and 35 which produce output voltages proportional to the intensity of the light incident upon the respective optical fiber elements. The resulting output voltages from the photodetectors are applied to a difference amplifier 37.

Neglecting for the moment the action of the active retardation plate 19, the output signal of the difference amplifier 37 will be proportional to the difference in intensity of the beams incident on the optical fibers 33 and 35 and this difference in intensities is, in turn, proportional to the applied force F as was discussed in the aforementioned McMahon patent application Ser. No. 248,616.

The output of the difference amplifier through a straightforward feedback circuit including an amplfier 39 and driver circuit 41 to a variable intensity light source 43. Light from the source 43 is coupled via an optical fiber 44 to a photo detector 45 which produces a voltage V suitable for driving the active retardation plate 19. A conventional power supply 46 serves to energize the source 43.

The various elements in the feedback loop are adjusted so that with no stress applied to the elasto-optic memeber 21. The retardation provided by the active retardation plate will be just sufficient to supply equal optical output beams to the detectors 33 and 35. As stress is applied to the elasto-optic member 21, the optical beams will no longer be balanced and a finite difference signal will be produced by the difference amplifier. This difference signal acts to change the intensity of the light source 43 which, in turn, alters the detector output voltage V applied to the retardation plate 19 until the retardation provided by the active retardation plate annuls the effects of the stress induced retardation.

The amount of power necessary to achieve such a null condition is indicated by a power monitor 47 and used as a measure of the magnitude of the applied force F.

Because the feedback loop operates so as to cancel the effects of changes in the elasto-optic member caused by the forces to be measured, the circuit continually operates in its most sensitive and linear region.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. Apparatus for measuring applied forces comprising:

a light source of constant intensity, means for directing light from said source into a collimated beam, polarizing means coupled to receive said collimated beam and positioned to produce a light beam polarized at a predetermined angle with respect to a given axis, wave retardation means for providing phase changes to said polarized light beam in response to voltages applied thereto, birefringent means positioned to receive light from said wave retardation means and oriented to provide first and second phase shifts for components of polarized light beams parallel to and at right angles to said given axis respectively, said first and second phase shifts being functions of applied forces, output means responsive to said light beams emanating from said birefringent means for providing an electrical output signal representative of phase differences between components of said polarized light beams parallel to said given axis and components of said polarized light perpendicular to said given axis, a light source of variable intensity, said intensity being a function of voltages applied to said light source;

feedback means coupled between said variable light source and said output means for coupling signals representative of said phase difference representative signals to said variable light source, a photodetector having output terminals coupled to said wave retardation means such that voltages produced at said output terminals in response to light received at input terminals of said photodetector are provided to said wave retardation means as said applied voltages, optical fiber means coupled to said input terminals of said photodetector and positioned to receive light from said variable light source for coupling light emanating from said variable light source to said input terminals of said photodetector, and means coupled to said feedback means for monitoring electrical power feedback to said wave retardation means, said feedback power being indicative of said applied forces when voltages coupled from said photodetector to said wave retardation means causes phase changes to said polarized light that annul phase shifts caused by said applied forces to said birefringed means.

2. The apparatus of claim 1 wherein the output means includes:

beam splitting means positioned to receive light emanating from said birefringent means for providing first and second components at ±45° with respect to said given axis respectively, first and second detector means for providing electrical signals representative of light intensities of said first and second components, and difference amplifier means coupled to receive said electrical signals representative of said first and second component light intensities for providing electrical feedback signals representative of differences in said representative electrical signals.

* * * * *